Aug. 11, 1970  C. H. BLOOD  3,523,594
BRAKE MECHANISM PARTICULARLY FOR LOCKING SENSITIVE
OPTICAL INSTRUMENTS IN POSITION
Filed Sept. 19, 1968  3 Sheets-Sheet 1

CHARLES H. BLOOD
INVENTOR.

BY *[signature]*

AGENT

CHARLES H. BLOOD
INVENTOR.

CHARLES H. BLOOD
INVENTOR.

3,523,594
BRAKE MECHANISM PARTICULARLY FOR LOCKING SENSITIVE OPTICAL INSTRUMENTS IN POSITION
Charles H. Blood, Rochester, N.Y., assignor to Bausch & Lomb Incorporated, Rochester, N.Y., a corporation of New York
Filed Sept. 19, 1968, Ser. No. 760,940
Int. Cl. B60t 13/04
U.S. Cl. 188—171
11 Claims

ABSTRACT OF THE DISCLOSURE

A brake mechanism is provided for accurately holding sensitive optical instruments, such as an electronic retinoscope, in position. A thin cantilevered spring plate, attached to one member of the instrument, is positioned between a pair of opposed brake shoes which are attached to a second member which normally may move relative to the first member. A tension spring and a solenoid cooperate with a camming bar to force and withdraw, respectively, the shoes into and from contact with the spring plate. Because the spring plate is soft in only one direction, normal to the relative movement of the two members, little energy is transmitted through the spring plate to the members upon application of the brake.

BACKGROUND OF THE INVENTION

This invention is related to brake mechanisms and is more particularly concerned with brake mechanisms for accurately holding a sensitive optical instrument in a predetermined position.

Many modern sophisticated optical, electro-optical, and electronic instruments must be accurately aligned with their subjects in order to perform their intended functions. Numerous optical and electronic devices and techniques necessarily have been developed for achieving such alignment. However, the limiting factor in these instruments, in general, is the locking mechanisms, because any movement or alteration of position caused by the engagement of the locking mechanism can limit or destroy the overall accuracy of the alignment capability of these instruments. There is present in all practical mechanical devices a certain amount of play to overcome manufacturing tolerance buildup problems. When the locking mechanism imparts a force or energy into such a system, movement within the play can occur.

Previously in optical instruments, the practice has been to force one structural member against another structural member thereby binding the apparatus and restricting further movement. This technique tends to cause movements within the instrument. In addition, many of these instruments are utilized by personnel who are not normally inclined to take the necessary precautions to exclude such movement, for example, by overcompensating to counteract the play. In other words, they want the instrument to operate with a minimum of care as to mechanical details.

By way of example, recently the electronic retinoscope has been developed for automatically determining the optical characteristics of the living eye. As such, it is an instrument which requires precise alignment and is employed by doctors who cannot afford to spend a great amount of time to adjust the alignment of the instrument. Also, because the subject is the living eye which may be moved very quickly, in order to make such a device operable, the alignment of the instrument must be accomplished quickly and then followed quickly, without appreciable movement, by locking the instrument accurately in position.

Most methods of absorbing the energy involved in the locking action are not practical either, because they introduce additional play into the mechanical system. The problem is thereby compounded.

SUMMARY OF THE INVENTION

Accordingly, it is an object of the present invention to provide a brake mechanism which may be actuated without causing appreciable movement of the associated structural members being locked in position.

A second object of the present invention is to provide such a brake mechanism which is useful for holding a precision optical instrument in alignment.

Another object of the present invention is to provide such a brake mechanism which provides a positive lock and which may be quickly engaged.

A further object of the present invention is to provide such a brake mechanism which may be economically included in optical instruments.

Briefly, the invention in its broadest aspect provides a brake mechanism which upon actuation fixedly secures the relative position of a pair of interrelated structural members which are otherwise capable of relative movement, the freedom of movement defining a prescribed limited surface, and the actuation of the brake mechanism causing no appreciable relative movement along the prescribed surface. The brake mechanism, in combination, includes a cantilevered resilient member fixedly attached to one of the structural members, having a pair of surfaces parallel to the prescribed surface of relative movement, and at all points thereon affording a high resistance to movement tangential to its surfaces and a low resistance to movement normal to its surfaces. A pair of opposed brake shoes are located adjacent to the opposing parallel surfaces of the resilient member which at the limits of movement of the structural members extends between the opposed brake shoes. The pair of opposed brake shoes are attached to the second structural member and are capable of relative movement normal to the parallel surfaces of the resilient member. Means are provided for forcing the opposed brake shoes against the opposite parallel surfaces of the resilient member thereby fixedly securing the relative position of the structural members. Means are also provided for withdrawing the brake shoes to a position where the pair of structural members are free to move.

Further objects, advantages, and features of the invention will be apparent in the arrangement and construction of the constituent parts in detail as set forth in the following specification taken together with the accompanying drawing.

DETAILED DESCRIPTION OF THE PREFERRED EMBODIMENT

Figure 1:
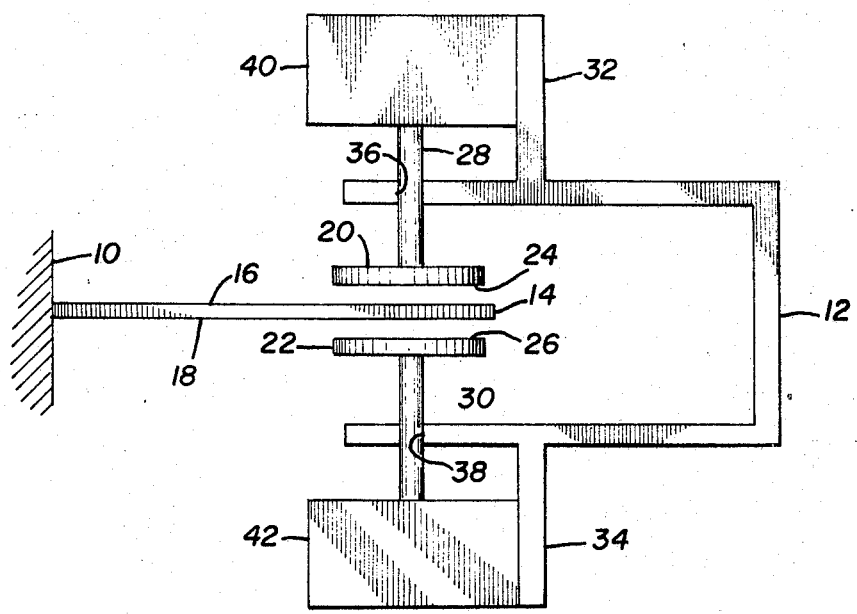
FIG. 1 is a schematic representation of the apparatus embodying the invention which is useful for explaining the principles thereof.

In the description of the several views of the drawing, like reference numerals refer to identical parts. Referring initially to FIG. 1 wherein there is shown a schematic representation of the parts combined in the present invention, two structural members 10 and 12 are shown which are capable of relative movement. As shown, the member 10 is fixed and the member 12 is free; however, as will be seen hereinafter, either member may be fixed or both members may be free so long as relative movement capability exists between the members. As will be shown and explained more fully hereinbelow, the relative movement of the members 10 and 12 must define a continuous surface of limited extent.

The brake mechanism is composed of a resilient member 14 attached to one of the structural members, in this figure, for example, member 10. The resilient member 14 has a pair of surfaces 16 and 18 which are parallel at all locations to the prescribed limited surface of relative movement between the members 10 and 12. Member 14, at all points thereon affords a high resistance to movement tangential to its surfaces 16 and 18 and a low resistance to movement normal to surfaces 16 and 18.

Located adjacent to the surfaces 16 and 18 are a pair of brake shoes 20 and 22, respectively. Brake shoes 20 and 22 are mounted to the member 12 and capable of movement relative to each other and normal to the surfaces 16 and 18. The faces 24 and 26 of the shoes 20 and 22, respectively, may be of any desired configuration as long as sufficient resistance to movement is generated when the faces 24 and 26 are in contact with the associated surfaces 16 and 18.

In this diagram of FIG. 1, the shoes 20 and 22 are attached to shafts 28 and 30, respectively, and are connected to the member 12 by brackets 32 and 34, respectively. The shafts 28 and 30 pass through apertures 36 and 38, respectively, in the member 12. Means 40 and 42 are provided and are associated with the shoes 20 and 22, respectively, for imparting the aforementioned relative movement to the shoes 20 and 22.

In operation, the shoes 20 and 22 are withdrawn from contact with the member 14 and the members 10 and 12 are moved relatively to a desired position along the prescribed limited surface of travel. Under these conditions, the means 40 and 42 are utilized to force the shoes 20 and 22 against the associated surfaces 16 and 18 of the member 14. Due to the resilient characteristics of the member 14, the engagement of the shoes 20 and 22 therewith may cause a movement of the member 14 normal to the surfaces 16 and 18. However, no appreciable force is generated in a tangential direction thereby preserving the relative position of the members 10 and 12. It should be noted that although a cantilevered spring is described as exemplary of the characteristics desired, any mounting which would provide the same resilient properties would be feasible.

This capability, as previously mentioned, is extremely important in many of the sophisticated electro-optical instruments of today. By means of example, the brake mechanism disclosed will be described in the context of such an instrument, the electronic retinoscope. The electronic retinoscope is an instrument for electro-optically examining the living eye to ascertain the refractive characteristics thereof. As such, the electronic retinoscope must be accurately aligned with respect to the subject eye and then firmly held in this position while the actual examination occurs. Necessarily, these positioning procedures must be accomplished quickly and the lock must be a positive lock.

Figure 2:
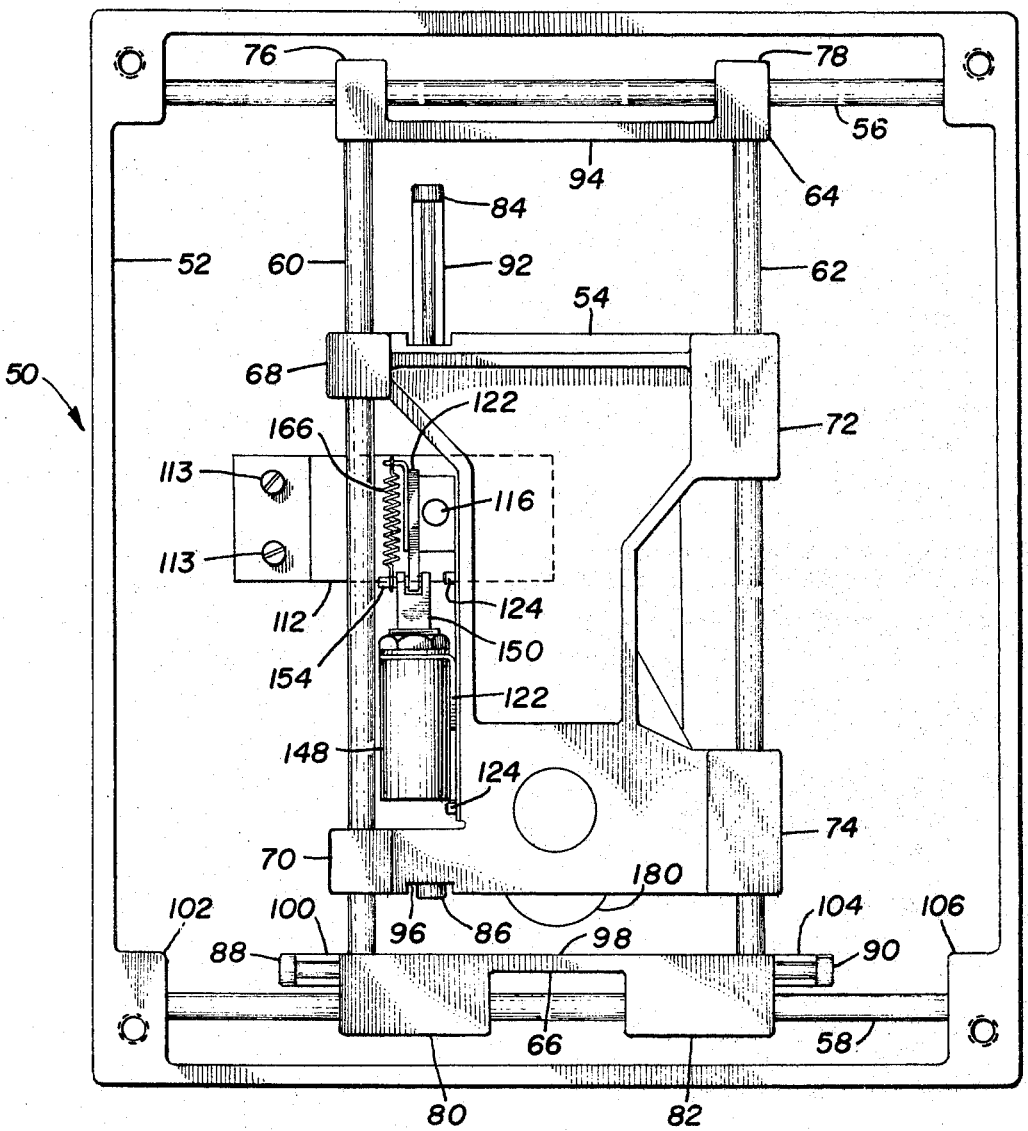
FIG. 2 is a bottom view of an electronic retinoscope embodying the present invention.

Referring now to FIG. 2, there is shown a bottom view of an electronic retinoscope generally designated by reference numeral 50. The retinoscope 50 has a base member 52 which rests on a table, not shown, or other suitable surface and is nominally considered to be the fixed structural member. An inner or floating member 54 carries the optics, not shown. The associated electronics are housed in a separate enclosure. Member 54 is mounted on the member 52 by means of parallel rods or rails 56 and 58 which are fixedly secured at their ends in the base 52. A second pair of parallel rods or rails 60 and 62 are provided which are aligned normal to the rods 56 and 58 and in a plane parallel to that plane containing rods 56 and 58. The inner member 54 is slidably mounted on the rods 60 and 62 to allow linear movement along the rods. Rods 60 and 62 are fixedly attached at their ends in a pair of carriage members 64 and 66 which in turn are slidably mounted on the rods 56 and 58, thereby affording a second linear movement normal to the aforementioned first linear movement. The interaction of the two movements generate a plane through which the inner member may be freely moved.

Inner member 54 is slidably attached to the rails 60 and 62 by passing the rail 60 through bearing blocks 68 and 70, and by passing the rail 62 through bearing blocks 72 and 74. Bearing blocks 68, 70, 72, and 74 are integral appendages of the member 54. In a similar manner, bearing blocks 76 and 78 are formed on the first carriage member 64 and slidably engage the rail 56, and bearing blocks 80 and 82 are formed on the second carriage member 66 and slidably engage the rod 58. Each of the bearing blocks 68–82 includes a pressed-in bearing, not shown, for ease of movement along the precisely positioned rails.

As previously stated, the plane of relative movement of the members 52 and 54 must be limited. In the electronic retinoscope this is accomplished by a series of four snubbers 84, 86, 88, and 90. Snubbers 84 and 86 limit the travel of floating member 54 along the rails 60 and 62. Snubber 84 is mounted to the end of a spacer rod 92 which is attached to the member 54. At the prescribed limit of travel along the rods 60 and 62, the snubber 84 engages an internal vertical face 94 on the carriage member 64. At other end of travel along the rails 60 and 62, the snubber 86, mounted in a recess 96 in member 54, engages an internal vertical face 98 on the second carriage member 66.

Travel along the rails 56 and 58 is limited at one end by the snubber 88 which is mounted on the end of a spacer rod 100 and which engages an internal boss 102 on the member 52. Likewise, the snubber 90 mounted on a spacer rod 104 engages a second internal boss 106 which is positioned opposite the boss 102 on the member 52. Rods 100 and 104 are fixedly attached to opposite ends of the carriage member 66.

Figure 3:
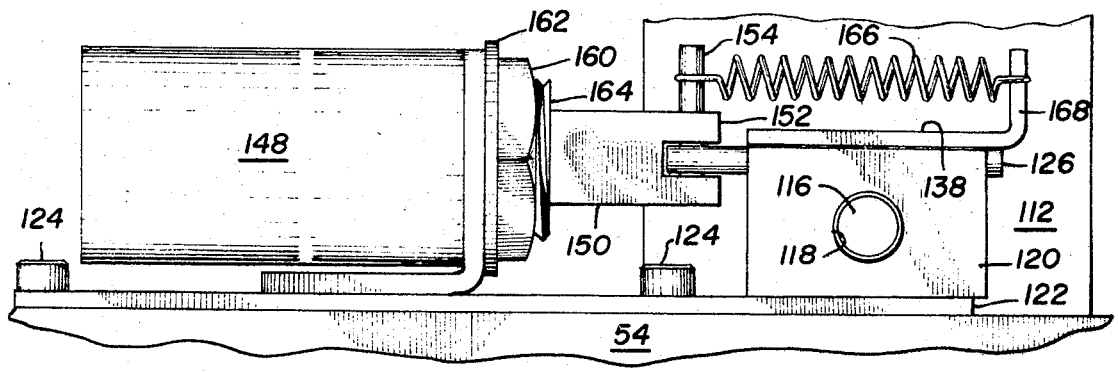
FIG. 3 is an enlarged bottom view of the electronic retinoscope showing only the components which comprise the brake mechanism as shown in FIG. 2.
Figure 4:
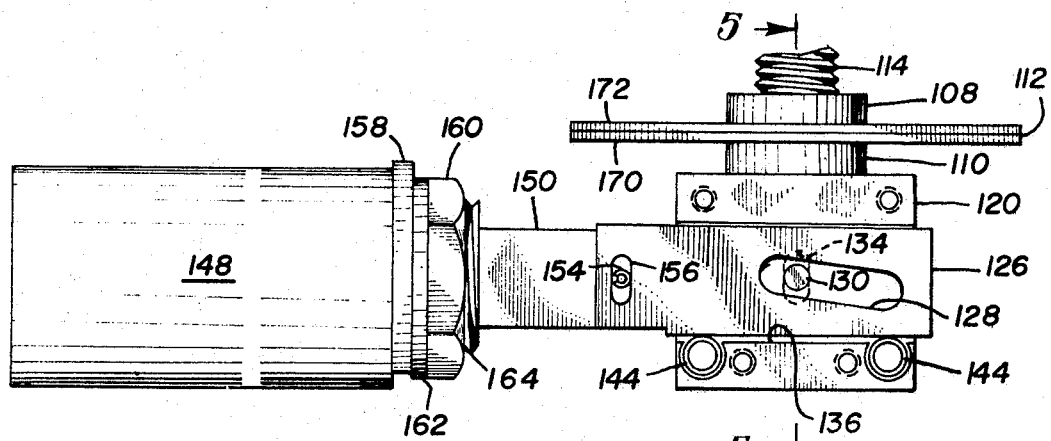
FIG. 4 is a side elevational view of the apparatus shown in FIG. 3 with certain parts removed for clarity of presentation.
Figure 5:
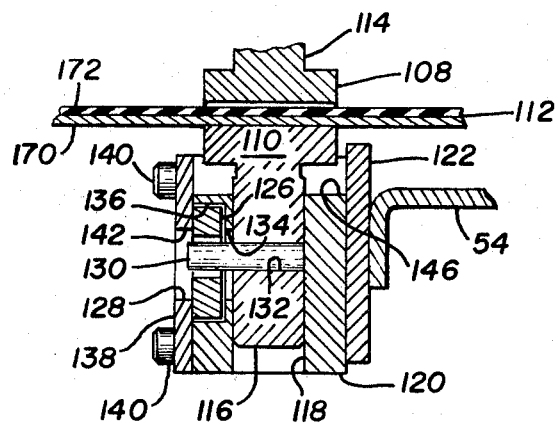
FIG. 5 is a sectional view taken along the plane of line 5—5 in FIG. 4.

As the actual brake mechanism is described in detail herebelow, references should be ad concurrently to FIGS. 3, 4, and 5, wherein various views of the parts are shown in an enlarged manner, along with FIG. 2. The brake mechanism as adapted to the electronic retinoscope includes a pair of brake shoes 108 and 110 which are positioned coaxially above and below, respectively, the brake pad 112 which has the resilient characteristics described hereinabove. Brake pad 112 is attached to the underside of the member 52 by screws 113. The pad 112 must be sufficiently large so that at all limits of travel of the member 54 relative to the member 52, the shoes 108 and 110 are always positioned with the pad 112 therebetween. Shoe 108 is adjustably mounted to the upper portion of the member 54 by means of a threaded shaft 114. Shoe 110 has an elongated shaft 116 which is slidably fitted in a bore 118 of a guide block 120. Block 120 is suitably attached to a brake assembly bracket 122 which is fastened to the member 54 by means of screws 124. Block 120 serves to guide the shoe 110 perpendicular to the pad 112 so that proper engagement is made.

The vertical position of the movable lower shoe 110 is controlled by the position of a camming bar 126 which includes an acutely oriented cam slot 128. A follower pin 130 is pressed into a horizontal bore 132 in the shaft 116. The pin 130 projects through a vertically oriented slot 134 in the wall of the guide block 120 into the cam slot 128. The camming bar 126 rides in and is constrained by a milled channel 136 in the side of the guide block 120. Slot 134 is cut in the wall of the channel 136. Therefore, as the camming bar 126 is slid horizontally in the channel 136, the shaft 116 and the shoe 110 slide vertically in the bore 118. In order to physically retain the camming bar 126 in the channel 136, a cover bracket 138 is fastened to the block 120 by screws 140. The bracket 138 also includes a vertical slot 142 similar to the slot 134 and into which the pin 130 also extends. Bearings 144 are fitted into the guide block 120 and project into the base of the channel 136 to allow the camming bar 126 to move freely through the channel 136.

The means for withdrawing the shoe 110 into a depression in the block 120 formed by a recess 146 and the brackets 122 and 138 includes a solenoid 148 having a movable core 150. The end of the core 150 is formed as a bifurcated yoke 152 which straddles the end of the camming bar 126. A split pin 154 is pressed through the bifurcations and the end of camming bar 126 to connect the core 150 and the bar 126. A vertical slot 156 is cut in each arm of the yoke 152 through which a pin 154 extends to provide for tolerance errors in the system. The solenoid 148 is also mounted to the assembly bracket 122 by means of a mounting bracket 158 which is suitably fastened to the bracket 122. The solenoid 148 is attached to a bracket 158 by means of a nut 160 and a washer 162 which are threaded onto a threaded portion 164 of the solenoid body.

The means for forcing the shoe 110 against the pad 112 includes a tension spring 166, one end of which is attached to one end of the split pin 154, and the other end of which is attached to a formed projection 168 on the cover bracket 138.

Figure 6:
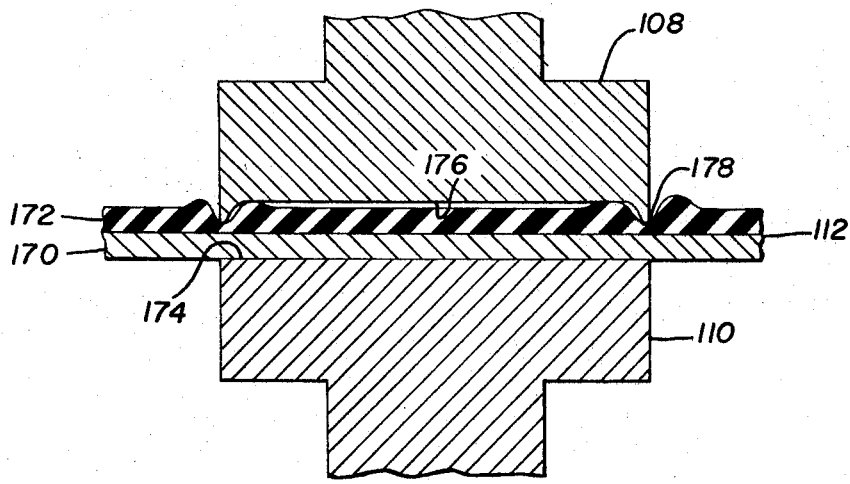
FIG. 6 is a greatly enlarged sectional view of the brake shoes and pad employed in the electronic retinoscope showing the interaction therebetween when the brake mechanism is engaged.

As a further feature of the invention, the brake pad 112 is a laminated pad composed of a thin metallic bottom section 170 and a top layer 172 composed of a soft resilient material, such as that marketed under the tradename Silastic rubber a product of Dow Corning, although leather or various natural rubber materials would function properly. The best showing of these features is in FIG. 6. The lower shoe 110 which mates with the bottom of the pad 112 has a smooth face 174. Therefore while the members 52 and 54 are being positioned, if the pad 112 rubs on the face 174, it will not catch. However, a face 176 of the upper shoe 108 has a sharp protuding ridge 178 around the periphery of the face 176 so that when the face 176 engages the soft resilient material 172 on the top of the pad 112, it is able to acquire a secure footing therein thereby providing a firm hold on the pad 112. The configuration of the face 176 could alternatively have many other protuberances thereon to seat in the top layer 172 of pad 112.

In operation, a "joy-stick" type of adjustment mechanism 180, the bottom of which is shown in FIG. 2, is employed to position the floating member 54 relative to the base 52. A push-button switch, not shown, is contained in the joy-stick handle which is used to energize solenoid 148. When energized, the solenoid 148 draws the core 150 inward causing the camming bar 126 to lower shoe 110 away from the brake pad 112. Due to the cantilevered flat plate design of pad 112, it sags away from the shoe 108 thereby completely breaking contact within the shoe-pad-shoe interface. the joy-stick is used to adjust the relative position of the members 52 and 54 along the two pairs of parallel rails 56–58 and 60–62.

When the retinoscope is precisely located, the switch is released thereby de-energizing the solenoid 148. At this point, the tension spring contracts to pull the core 150 from the solenoid 148 and forces the camming bar 126 in the opposite direction. The movement of the camming bar 126 forces the shoe 110 against the bottom of the brake pad 112. Brake pad 112 is then forced against the upper gripping shoe 108 to firmly hold the relative position of members 52 and 54 during the remainder of the tests on the subject eye.

While there has been shown and described what are considered to be the preferred embodiments of the present invention, it will be obvious to those skilled in the art that various changes and modifications may be made therein without departing from the spirit of the invention.

I claim:

1. A brake mechanism which upon actuation fixedly secures the relative position of a pair of interrelated structural members which are otherwise capable of relative movement, the freedom of movement defining a prescribed limited surface, the actuation of the mechanism causing no appreciable relative movement along the prescribed surface, the mechanism comprising, in combination:

a resilient member fixedly attached to one of the structural members, the resilient member having a pair of surfaces parallel to the prescribed surface of relative movement, the resilient member at all points thereon affording a high resistance to movement tangential to its surface and a low resistance to movement normal to its surface, a pair of opposed brake shoes located adjacent to the opposing parallel surfaces of the resilient member, the resilient member extending between the opposed brake shoes at the limits of movement of the structural members, the pair of opposed brake shoes being attached to the second structural member and being capable of relative movement normal to the parallel surfaces of the resilient member, means for forcing the opposed brake shoes against the opposite parallel surfaces of the resilient member thereby fixedly securing the relative position of the structural members, and means for withdrawing the brake shoes to a position where the pair of structural members are free to move.

2. A brake mechanism for positioning an optical instrument which upon actuation fixedly secures the relative position of a pair of interrelated structural members which are otherwise capable of relative movement, the freedom of movement defining a prescribed limited surface, the actuation of the mechanism causing no appreciable relative movement along the prescribed surface, the mechanism comprising, in combination;

a resilient member fixedly attached to one of the structural members, the resilient member having a pair of surfaces parallel to the prescribed surface of relative movement, the resilient member at all points thereon affording a single degree of freedom, the degree of freedom being normal to the pair of surfaces on the resilient member at all points thereon, a pair of opposed friction engaging members located adjacent to the opposing surfaces of the resilient member and generally parallel thereto, the resilient member extending between the opposed friction engaging members at the limits of movement of the structural members, the pair of opposed friction engaging members being attached to the second structural member and being capable of relative movement normal to the surfaces of the resilient member, means for forcing the opposed friction engaging members against the opposite surfaces of the resilient member thereby fixedly securing the relative position of the structural members, and means for withdrawing the friction engaging members to a position where the pair of structural members are free to move.

3. A brake mechanism according to claim 2, in which said optical instrument is an electronic retinoscope.

4. A brake mechanism according to claim 3, in which said surfaces are planar.

5. A brake mechanism for positioning an electronic retinoscope which upon actuation fixedly secures the relative position of a pair of interrelated structural members which are otherwise capable of limited horizontal planar relative movement, the actuation of the mechanism causing no appreciable relative horizontal movement, the mechanism comprising, in combination;
- a thin metallic spring plate fixedly attached in an essentially horizontal position to one of the structural members and being coextensive with the planar limits of travel of the second structural member relative to the first structural member,
- a pair of opposed brake shoes located adjacent to the opposing surfaces of the spring plate and generally parallel thereto,
- the pair of opposed brake shoes being attached to the second structural member and being capable of relative movement normal to the spring plate,
- means for forcing the opposed brake shoes against the opposite surfaces of the spring plate thereby fixedly securing the relative position of the structural members, and
- means for withdrawing the brake shoes to a position where the pair of structural members are free to move.

6. A brake mechanism according to claim 5, in which said spring plate attached to said structural member is a cantilevered plate extending between said brake shoes.

7. A brake mechanism for positioning an electronic retinoscope which upon actuation fixedly secures the relative position of a pair of interrelated structural members which are otherwise capable of limited horizontal planar relative movement, the actuation of the mechanism causing no appreciable relative horizontal movement, the mechanism comprising, in combination;
- a thin metallic spring plate fixedly attached to the first of the structural members as a cantilevered plate and being coextensive with the planar limits of travel of the second structural member relative to the first structural member,
- a pair of opposed brake shoes located adjacent to the opposing surfaces of the spring plate and generally parallel thereto,
- the first one of the pair of opposed brake shoes being attached to the second structural member below the spring plate,
- the first brake shoe being slidable with respect to the second structural member in a vertical direction normal to the spring plate,
- the second one of the pair of opposed brake shoes being fixedly attached to the second structural member above the spring plate,
- means for forcing the first brake shoe upwardly against the lower surface of the spring plate and the upper surface of the plate against the second brake shoe, thereby fixedly securing the relative position of the structural members, and
- means for withdrawing the first brake shoe downwardly to a position where the pair of structural members are free to move.

8. A brake mechanism according to claim 7, in which said first structural member is the stationary base and said second structural member is the horizontally movable carriage of said electronic retinoscope.

9. A brake mechanism according to claim 7, which is further characterized by the inclusion of
- a thin uniformly resilient coating on the upper surface of said spring plate, and
- said second brake shoe includes means for deformably engaging with the resilient coating on the upper surface of said spring plate.

10. A brake mechanism according to claim 9, in which said metallic spring plate is constructed of spring steel, said resilient coating is a thin layer of a soft resilient material,
- said means for deformably engaging said resilient coating comprises a ridge around the spring engaging face of said upper brake shoe,
- said first brake shoe has a smooth spring engaging face thereon, and
- the spring engaging faces of said brake shoes are circular.

11. A brake mechanism according to claim 7, in which said means for forcing comprises;
- a camming bar attached to said carriage and constrained to slide in a horizontal direction, having a cam slot therein,
- a pin mounted in said slidable first brake shoe and extending into the cam slot, and
- a tension spring having one end attached to said carriage and the other end attached to said camming bar, and said means for withdrawing comprises;
- a solenoid mounted on said carriage, the solenoid core being substantially parallel to the camming bar and attached to one end thereof, the retracting action of the solenoid being in opposition to the force of the tension spring.

References Cited

UNITED STATES PATENTS

| 2,433,794 | 12/1947 | Sprigman | 188—73 |
| 2,741,336 | 3/1956 | Fortini | 188—73 |
| 3,263,778 | 8/1966 | Pfeiffer | 188—71 X |

DUANE A. REGER, Primary Examiner

U.S. Cl. X.R.

188—73, 259